United States Patent
Kim et al.

(10) Patent No.: US 10,634,220 B2
(45) Date of Patent: Apr. 28, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jin Ho Kim, Suwon-si (KR); Jae Joon Lee, Anyang-si (KR); Jong Sool Park, Seongnam-si (KR); Kyeong Hun Lee, Seoul (KR); Jong Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 53 days.

(21) Appl. No.: 16/182,423

(22) Filed: Nov. 6, 2018

(65) Prior Publication Data
US 2020/0003282 A1    Jan. 2, 2020

(30) Foreign Application Priority Data
Jul. 2, 2018 (KR) .................. 10-2018-0076651

(51) Int. Cl.
*F16H 3/66* (2006.01)

(52) U.S. Cl.
CPC ....... *F16H 3/66* (2013.01); *F16H 2200/0069* (2013.01); *F16H 2200/2015* (2013.01); *F16H 2200/2046* (2013.01)

(58) Field of Classification Search
CPC ............... F16H 3/66; F16H 2200/0069; F16H 2200/2015; F16H 2200/2046
See application file for complete search history.

(56) References Cited

U.S. PATENT DOCUMENTS

| | | | | |
|---|---|---|---|---|
| 4,531,428 A * | 7/1985 | Windish | ............... | F16H 3/66 475/279 |
| 8,827,862 B2 * | 9/2014 | Koch | ............... | F16H 3/66 475/277 |
| 8,845,477 B2 * | 9/2014 | Koch | ............... | F16H 3/66 475/280 |
| 8,915,820 B2 * | 12/2014 | Koch | ............... | F16H 3/64 475/276 |
| 9,982,757 B1 * | 5/2018 | Kim | ............... | F16H 3/66 |

(Continued)

FOREIGN PATENT DOCUMENTS

DE 102013216613 A1 * 2/2015 ............... F16H 3/66
KR 10-2017-0108440 A 9/2017

*Primary Examiner* — David R Morris
(74) *Attorney, Agent, or Firm* — Morgan, Lewis & Bockius LLP (57) ABSTRACT

A planetary gear train of an automatic transmission for a vehicle may include an input shaft configured to receive power, an output shaft configured to output power; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotation elements; and first to ninth shafts connecting the rotation elements of the first to fifth planetary gear sets.

14 Claims, 3 Drawing Sheets

(56) References Cited

U.S. PATENT DOCUMENTS

| | | | | |
|---|---|---|---|---|
| 10,113,616 B2* | 10/2018 | Beck | ............... | F16H 3/66 |
| 10,184,546 B2* | 1/2019 | Kim | ............... | F16H 3/66 |
| 10,309,491 B2* | 6/2019 | Kim | ............... | F16H 3/66 |
| 10,316,937 B2* | 6/2019 | Kim | ............... | F16H 3/66 |
| 10,495,189 B2* | 12/2019 | Kim | ............... | F16H 3/66 |
| 2014/0004991 A1* | 1/2014 | Koch | ............... | F16H 3/66 |
| | | | | 475/276 |
| 2014/0038765 A1* | 2/2014 | Koch | ............... | F16H 3/66 |
| | | | | 475/276 |
| 2014/0038766 A1* | 2/2014 | Koch | ............... | F16H 3/66 |
| | | | | 475/276 |
| 2016/0201767 A1* | 7/2016 | Beck | ............... | F16H 3/66 |
| | | | | 475/269 |
| 2018/0328464 A1* | 11/2018 | Kim | ............... | F16H 3/66 |
| 2018/0328468 A1* | 11/2018 | Kim | ............... | F16H 3/66 |
| 2018/0328469 A1* | 11/2018 | Kim | ............... | F16H 3/66 |
| 2019/0128383 A1* | 5/2019 | Kim | ............... | F16H 3/66 |
| 2019/0195319 A1* | 6/2019 | Kim | ............... | F16H 3/66 |
| 2019/0390738 A1* | 12/2019 | Kim | ............... | F16H 3/44 |
| 2020/0003280 A1* | 1/2020 | Kim | ............... | F16H 3/62 |
| 2020/0003281 A1* | 1/2020 | Kim | ............... | F16H 3/62 |

* cited by examiner

| SHIFT STAGE | ENGAGEMENT ELEMENT | | | | | | GEAR RATIO | INTER-STAGE RATIO |
|---|---|---|---|---|---|---|---|---|
| | CL1 | CL2 | CL3 | B1 | B2 | B3 | | |
| 1ST | | | | O | O | O | 6.028 | – |
| 2ND | | O | | | O | O | 4.090 | 1.474 |
| 3RD | | O | | O | | O | 2.902 | 1.409 |
| 4TH | | O | O | | | O | 1.973 | 1.471 |
| 5TH | O | O | | | | O | 1.522 | 1.296 |
| 6TH | O | | O | | | O | 1.202 | 1.266 |
| 7TH | O | O | O | | | | 1.000 | 1.202 |
| 8TH | O | | O | | O | | 0.830 | 1.205 |
| 9TH | O | | | O | O | | 0.730 | 1.137 |
| 10TH | O | O | | | O | | 0.625 | 1.168 |
| REV | | | O | O | | O | −4.733 | – |

FIG. 3

PLANETARY GEAR TRAIN OF AUTOMATIC TRANSMISSION FOR VEHICLE

CROSS REFERENCE TO RELATED APPLICATION

The present application claims priority to Korean Patent Application No. 10-2018-0076651, filed Jul. 2, 2018, the entire contents of which is incorporated herein for all purposes by this reference.

BACKGROUND OF THE INVENTION

Field of the Invention

The present invention relates to a planetary gear train of an automatic transmission for a vehicle.

Description of Related Art

Multi-staging of a transmission is used to improve the fuel efficiency of a vehicle by facilitating operation of an engine in a more efficient region over the entire driving range of a vehicle, and to improve the driving performance of the vehicle by rapidly providing a more suitable gear ratio in a response to driver demand.

Therefore, to achieve the above-mentioned effect of multi-staging of the transmission as described above, it is preferable that an inter-stage ratio, which is a difference in gear ratio between adjacent shifting stages is appropriately secured while increasing a gear ratio span, which is the total gear ratio range which may be provided by the transmission, and that the inter-stage ratio changes linearly as much as possible.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, which is configured for providing 10 forward shifting stages and a reverse stage and ensuring sufficient durability due to relatively low torque to be endured by components while ensuring a wide gear ratio span, an inter-stage ratio of a predetermined level or more, and linearity in the inter-stage ratio.

to achieve the above-described aspect, a planetary gear train of an automatic transmission for a vehicle may include: an input shaft configured to receive power; an output shaft configured to output power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a fifth planetary gear set having thirteenth, fourteenth, and fifteenth rotation elements; a first shaft connected to the second rotation element, the sixth rotation element, and the input shaft; a second shaft connected to the fourteenth rotation element and the output shaft; a third shaft connected to the third rotation element; a fourth shaft connected to the fourth rotation element and the seventh rotation element; a fifth shaft connected to the fifth rotation element and the thirteenth rotation element; a sixth shaft connected to the eleventh rotation element and the fifteenth rotation element; a seventh shaft connected to the first rotation element and the ninth rotation element; an eighth shaft connected to the eighth rotation element and the tenth rotation element; and a ninth shaft connected to the twelfth rotation element.

The planetary gear train may include six coupling elements for selectively connecting two shafts among the first to ninth shafts or the transmission housing and a shaft among the first to ninth shafts, and among the six coupling elements, three coupling elements may be operatively controlled to be simultaneously coupled to each other such that a specific one of the forward or reverse shifting stages is implemented.

The six coupling elements may include three clutches configured to interconnect two shafts among the first to ninth shafts, and three brakes configured to selectively connect a shaft, which is not connected to the input shaft or the output shaft among the first to ninth shafts, to the transmission housing.

The six coupling elements may include a first clutch configured between the second shaft and the third shaft, a second clutch configured between the first shaft and the fifth shaft, a third clutch configured between the fifth shaft and the seventh shaft, a first brake configured between the seventh shaft and the transmission housing, a second brake configured between the eighth shaft and the transmission housing, and a third brake configured between the ninth shaft and the transmission housing.

The six coupling elements may include: a first clutch configured between the second shaft and the third shaft, a second clutch configured between the fourth shaft and the fifth shaft, a third clutch configured between the fifth shaft and the seventh shaft, a first brake configured between the seventh shaft and the transmission housing, a second brake configured between the eighth shaft and the transmission housing, and a third brake configured between the ninth shaft and the transmission housing.

The second planetary gear set may be configured such that two of the first, fourth, and fifth shafts are selectively connectable to rotate integrally.

The first, second, and third rotation elements may include a first sun gear, a first planet carrier, and a first ring gear, the fourth, fifth, and sixth rotation elements may include a second sun gear, a second planet carrier, and a second ring gear, the seventh, eighth, and ninth rotation elements may include a third sun gear, a third planet carrier, and a third ring gear, the tenth, eleventh and twelfth rotation elements may include a fourth sun gear, a fourth planet carrier and a fourth ring gear, and the thirteenth, fourteenth, and fifteenth rotation elements may include a fifth sun gear, a fifth planet carrier, and a fifth ring gear.

The first, second, third, fourth, and fifth planetary gear sets may be disposed in the order of the first, second, third, fourth, and fifth planetary gear sets from one side to the other side thereof.

to achieve the above-described aspect, a planetary gear train of an automatic transmission for a vehicle of the present invention may include: a first planetary gear set, a second planetary gear set, a third planetary gear set, a fourth planetary gear set, and a fifth planetary gear set, each of which may include three rotation elements; six coupling elements configured to provide a frictional force variably; and nine shafts connected to the rotation elements of the planetary gear sets.

The first shaft is directly connected to the second rotation element of the first planetary gear set, the third rotation element of the second planetary gear set, and the input shaft, the second shaft is directly connected to the second rotation element of the fifth planetary gear set and the output shaft, the third shaft is directly connected to the third rotation element of the first planetary gear set, the fourth shaft is directly connected to the first rotation element of the second planetary gear set and the first rotation element of the third planetary gear set, the fifth shaft is directly connected to the second rotation element of the second planetary gear set and the first rotation element of the fifth planetary gear set, the sixth shaft is directly connected to the second rotation element of the fourth planetary gear set and the third rotation element of the fifth planetary gear set, and the remaining three shafts are disposed in the transmission housing to be configured for being fixed.

The three shafts, which are configured for being fixed to the transmission housing, may include the seventh shaft, the eighth shaft, and the ninth shaft. The seventh shaft may be directly connected to the first rotation element of the first planetary gear set and the third rotation element of the third planetary gear set, the eighth shaft may be directly connected to the second rotation element of the third planetary gear set and the first rotation element of the fourth planetary gear set, and the ninth shaft may be directly connected to the third rotation element of the fourth planetary gear set.

Among the six coupling elements, the first clutch may be disposed between the second shaft and the third shaft, the second clutch may be disposed between the first shaft and the fifth shaft, the third clutch may be disposed between the fifth shaft and the seventh shaft, the first brake may be disposed between the seventh shaft and the transmission housing, the second brake may be disposed between the eighth shaft and the transmission housing, and the third brake may be disposed between the ninth shaft and the transmission housing.

Among the six coupling elements, the first clutch may be disposed between the second shaft and the third shaft, the second clutch may be disposed between the fourth shaft and the fifth shaft, the third clutch may be disposed between the fifth shaft and the seventh shaft, the first brake may be disposed between the seventh shaft and the transmission housing, the second brake may be disposed between the eighth shaft and the transmission housing, and the third brake may be disposed between the ninth shaft and the transmission housing.

The first to fifth planetary gear sets may be disposed in the order of the first planetary gear set, the second planetary gear set, the third planetary gear set, the fourth planetary gear set, and the fifth planetary gear set in the axial direction of the input shaft and the output shaft.

The rotation elements of each of the first to fifth planetary gear sets may be disposed in the order of the first rotation elements, the second rotation elements, and the third rotation elements toward the radially external side from the rotation center.

A planetary gear train of an automatic transmission for a vehicle according to an exemplary embodiment of the present invention forms shifting stages of forward 10 speeds and 1 reverse speed and has a gear ratio span of 9.6. Thus, the fuel efficiency of the vehicle may be improved by making it possible to drive the engine mainly in a more efficient region.

Furthermore, according to an exemplary embodiment of the present invention, it is possible to achieve the minimum inter-stage ratio of 1.137 or more and linearity in the change of the inter-stage ratio according to the change of the shifting stage. Thus, vehicle acceleration and rhythm of engine speed before and after shifting may be improved, so that the driving performance of the vehicle may be maximized.

Furthermore, according to an exemplary embodiment of the present invention, it is possible to ensure sufficient durability due to relatively low torque to be endured by components while ensuring a wide gear ratio span, an inter-stage ratio of a predetermined level or more, and linearity in the inter-stage ratio.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other aspects, features and advantages present invention

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 1:
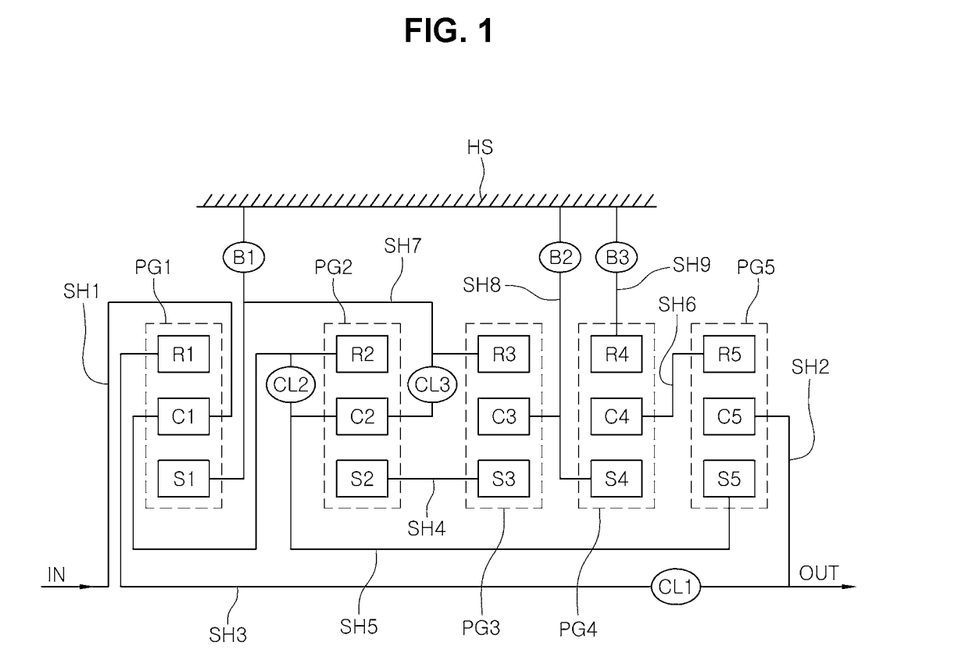
FIG. 1 is a view exemplarily illustrating various exemplary embodiments of a planetary gear train of an automatic transmission for a vehicle according to an exemplary embodiment of the present invention.

Referring to FIG. 1, a planetary gear train of an automatic transmission for a vehicle of the present invention includes: an input shaft IN configured to receive power from a power source such as an engine or the like; an output shaft OUT configured to output power; a first planetary gear set PG1 including first, second, and third rotation elements; a second planetary gear set PG2 including fourth, fifth, and sixth rotation elements; a third planetary gear set PG3 including seventh, eighth, and ninth rotation elements; a fourth planetary gear set PG4 including tenth, eleventh, and twelfth rotation elements; and a fifth planetary gear set PG5 including the thirteenth, fourteenth, and fifteenth rotation elements.

The planetary gear train includes: a first shaft SH1 connected to the second rotation element, the sixth rotation element, and the input shaft IN; a second shaft SH2 connected to the fourteenth rotation element and the output shaft OUT; a third shaft SH3 connected to the third rotation element; a fourth shaft SH4 connected to the fourth rotation element and the seventh rotation element; a fifth shaft SH5 connected to the fifth rotation element and the thirteenth rotation element; a sixth shaft SH6 connected to the eleventh rotation element and the fifteenth rotation element; a seventh shaft SH7 connected to the first rotation element and the ninth rotation element; an eighth shaft SH8 connected to the eighth rotation element and the tenth rotation element; and a ninth shaft SH9 connected to the twelfth rotation element.

The first to fifth planetary gear sets PG1 to PG5 are disposed in the order of the first planetary gear set PG1, the second planetary gear set PG2, the third planetary gear set PG3, the fourth planetary gear set PG4, and the fifth planetary gear set PG5 from one side toward the other side thereof with respect to an engine side.

That is, a power source such as an engine is connected to the second rotation element of the first planetary gear set PG1 via the input shaft IN and the first shaft SH1 to provide power. The power supplied as described above is appropriately shifted through the configuration of the present invention in which the first planetary gear set PG1, the second planetary gear set PG2, the third planetary gear set PG3, the fourth planetary gear set PG4, and the fifth planetary gear set PG5 are disposed in order, and is then drawn to the output shaft OUT through the fourteenth rotation element of the fifth planetary gear set PG5 and the second shaft SH2.

Each of the first planetary gear set PG1, the second planetary gear set PG2, a third planetary gear set PG3, the fourth planetary gear set PG4, and the fifth planetary gear set PG5, which form the planetary gear train, is constituted as a single pinion planetary gear set having three rotation elements.

The planetary gear train is mounted in a transmission housing HS, a torque converter may be provided between the power source and the input shaft IN, and the power drawn to the output shaft OUT may be transmitted to a drive wheel of the vehicle through a differential.

The planetary gear train includes six coupling elements for selectively connecting two shafts among the first to ninth shafts SH1 to SH9 or the transmission housing and a shaft among the first to ninth shafts SH1 to SH9, and among the six coupling elements, three coupling elements are operatively controlled to be simultaneously coupled to each other such that a specific one of the forward or reverse shifting stages is implemented.

Figure 2:
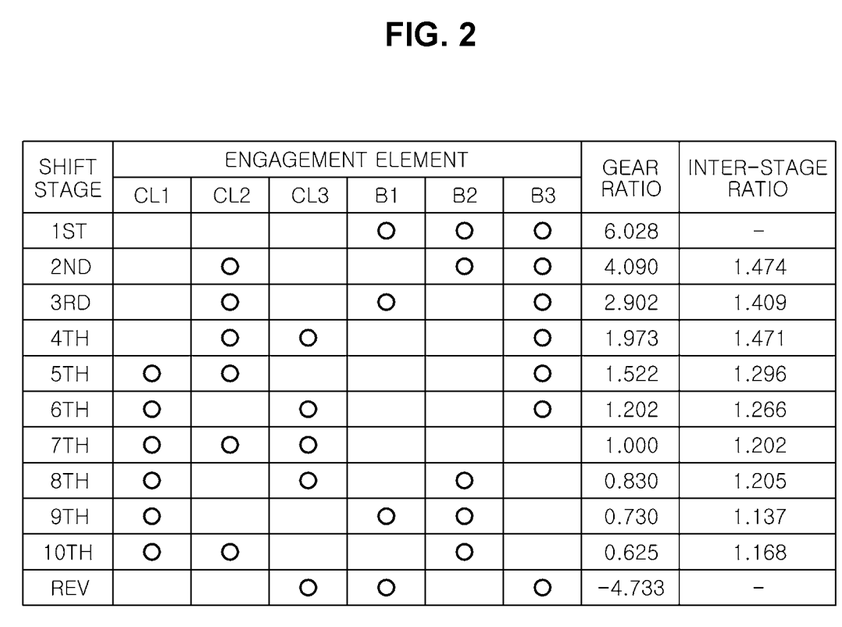
FIG. 2 is an operation table of the planetary gear train of FIG. 1.

That is, in implementing any one of 1 to 10 forward shifting stages and an R stage, which is a reverse stage, as illustrated in FIG. 2, it is possible to combine three specified coupling elements among the six coupling elements to implement a corresponding shifting stage.

Of course, the planetary gear train is configured to enable CLUTCH-TO-CLUTCH shifting in which when shifting to an adjacent shifting stage among the shifting stages, shifting is performed by releasing one coupling element, at the current shifting stage, from the three coupling elements required for implementing each shifting stage, and at the same time, by coupling another coupling element at a target shifting stage.

The six coupling elements include three clutches that connect two shafts among the first to ninth shafts SH1 to SH9, and three brakes that selectively connect the transmission housing and a shaft which is not connected to the input shaft IN or the output shaft OUT among the first to ninth shafts SH1 to SH9.

In the various exemplary embodiments of FIG. 1, the six coupling elements include a first clutch CL1 configured between the second shaft SH2 and the third shaft SH3, a second clutch CL2 configured between the first shaft SH1 and the fifth shaft SH5, a third clutch CL3 configured between the fifth shaft SH5 and the seventh shaft SH7, a first brake B1 configured between the seventh shaft SH7 and the transmission housing, a second brake B2 configured between the eighth shaft SH8 and the transmission housing, and a third brake B3 configured between the ninth shaft SH9 and the transmission housing.

Figure 3:
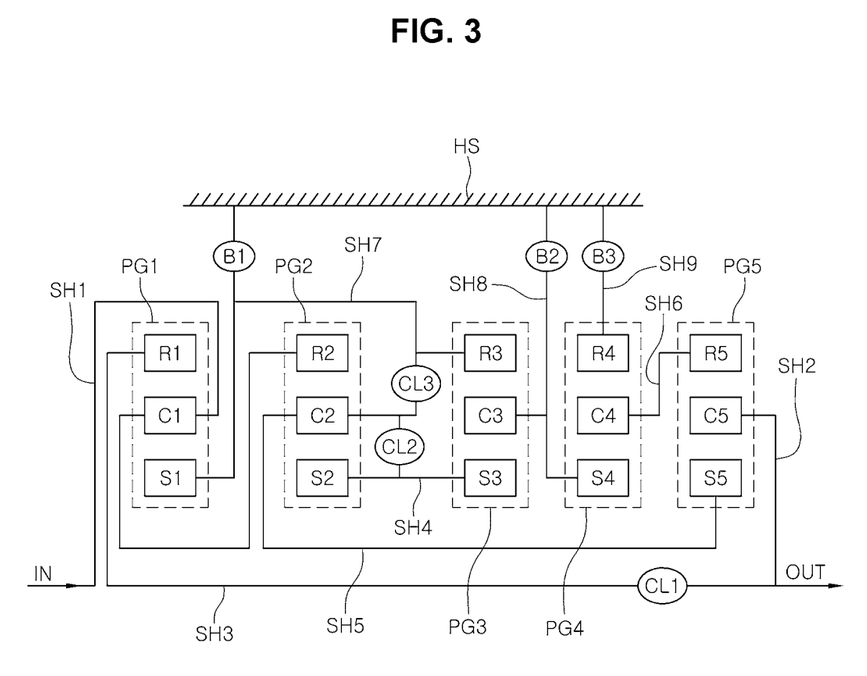
FIG. 3 is a view exemplarily illustrating various exemplary embodiments of a planetary gear train of an automatic transmission for a vehicle according to an exemplary embodiment of the present invention.

The various exemplary embodiments of FIG. 3 is different from the various exemplary embodiments only in the arrangement of the second clutch CL2 among the six coupling element and the other configuration of the various exemplary embodiments is the same as that of the various exemplary embodiments. In the various exemplary embodiments of the present invention, the six coupling elements include a first clutch CL1 configured between the second shaft SH2 and the third shaft SH3, a second clutch CL2 configured between the fourth shaft SH4 and the fifth shaft SH5, a third clutch CL3 configured between the fifth shaft SH5 and the seventh shaft SH7, a first brake B1 configured between the seventh shaft SH7 and the transmission housing, a second brake B2 configured between the eighth shaft SH8 and the transmission housing, and a third brake B3 configured between the ninth shaft SH9 and the transmission housing.

In both of the various exemplary embodiments of the present invention, the second planetary gear set PG2 is configured such that two of the first, fourth, and fifth shafts SH5 are selectively connectable to rotate integrally.

The first, second, and third rotation elements include a first sun gear S1, a first planet carrier C1, and a first ring gear R1, the fourth, fifth, and sixth rotation elements include a second sun gear S2, a second planet carrier C2, and a second ring gear R2, the seventh, eighth, and ninth rotation elements include a third sun gear S3, a third planet carrier C3, and a third ring gear R3, the tenth, eleventh and twelfth rotation elements include a fourth sun gear S4, a fourth planet carrier C4, and a fourth ring gear R4, and the thirteenth, fourteenth, and fifteenth rotation elements include a fifth sun gear S5, a fifth planet carrier C5, and a fifth ring gear R5.

The planetary gear train of an automatic transmission for a vehicle according to an exemplary embodiment of the present invention configured as described above implements shifting stages according to an operation table as represented in FIG. 2.

The first shifting stage is implemented by causing the first brake B1, the second brake B2, and the third brake B3 to be engaged with each other.

The power input to the first planet carrier C1 of the first planetary gear set PG1 through the input shaft IN and the first shaft SH1 is transmitted to the second ring gear R2 of the second planetary gear set PG2. Since the third ring gear R3 of the third planetary gear set PG3 is fixed by the first brake B1 and the third planet carrier C3 is fixed by the second brake B2, the third sun gear S3 is also in the fixed state, and thus, the second sun gear S2 connected to the third sun gear S3 via the fourth shaft SH4 is also in the fixed state. Therefore, the power input to the second ring gear R2 is decelerated by the second planet carrier C2 and transmitted to the fifth sun gear S5 of the fifth planetary gear set PG5 through the fifth shaft SH5.

Since the fourth sun gear S4 of the fourth planetary gear set PG4 is fixed by the second brake B2 and the fourth ring gear R4 is fixed by the third brake B3, the fourth planet carrier C4 is also fixed and the fifth ring gear R5 connected to the fourth planet carrier C4 via the sixth shaft SH6 is also in the fixed state.

Therefore, the power transmitted to the fifth sun gear S5 is decelerated again in the fifth planet carrier C5 and is drawn out while forming the first shifting stage with the second shaft SH2 and the output shaft OUT.

Shifting to the second shifting stage is implemented by causing the first brake B1 to be released and the second clutch CL2 to be engaged.

All the rotation elements of the second planetary gear set PG2 are integrated and rotated by the engagement of the second clutch CL2, and the power of the second planetary gear set PG2 is transmitted to the fifth sun gear S5 through the fifth shaft SH5 connected to the second planet carrier C2.

The fourth sun gear S4 and the fourth ring gear R4 of the fourth planetary gear set PG4 are fixed by the second brake B2 and the third brake B3, respectively. Thus, the fourth planet carrier C4 is also in the fixed state, and thus the fifth sun gear S5 is also in the fixed state.

Therefore, the power supplied to the fifth sun gear S5 is decelerated again in the fifth planet carrier C5 and is drawn out while forming the second shifting stage with the second shaft SH2 and the output shaft OUT.

Shifting to the third shifting stage is implemented by causing the second brake B2 to be released and the first brake B1 to be engaged.

The power of the second planetary gear set PG2 integrated by the engagement of the second clutch CL2 is transmitted to the fifth sun gear S5 through the fifth shaft SH5 and is transmitted to the third sun gear S3 through the fourth shaft SH4.

Since the third ring gear R3 is fixed by the first brake B1, the power supplied to the third sun gear S3 is decelerated by the third planet carrier C3 and is transmitted to the fourth sun gear S4 via the eighth shaft SH8. Since the fourth ring gear R4 is fixed by the third brake B3, the power of the fourth sun gear S4 is decelerated by the fourth planet carrier C4 and is transmitted to the fifth ring gear R5.

Accordingly, the fifth planetary gear set PG5 receives torque in parallel through the fifth sun gear S5 and the fifth ring gear R5, and forms the output of the third shifting stage through the fifth planet carrier C5 such that the output drawn out through the second shaft SH2 and the output shaft OUT.

By implementing the torque parallel scheme which causes power to be input in parallel to the two rotation elements of a planetary gear set as described above, the torque to be endured by each of the rotation elements of the planetary gear set is reduced, so that durability and efficiency of the components forming the planetary gear train may be improved.

Shifting to the fourth shifting stage is implemented by causing the first brake B1 to be released and the third clutch CL3 to be engaged.

All the rotation elements of the second planetary gear set PG2 are integrated by the engagement of the second clutch CL2, the second sun gear S2 is integrally connected to the third sun gear S3 through the fourth shaft SH4, and the second planet carrier C2 is connected to the third ring gear R3 by the engagement of the third clutch CL3. Consequently, the third sun gear S3 and the third ring gear R3 are restrained at the same rotation speed such that all the elements of the third planetary gear set PG3 rotate integrally.

The third planet carrier C3 of the third planetary gear set PG3 transmits power to the fourth sun gear S4 through the eighth shaft SH8, and the fourth ring gear R4 is fixed by the third brake B3. Thus, the power of the fourth sun gear S4 is decelerated through the fourth planet carrier C4 and the sixth shaft SH6 and is supplied to the fifth ring gear R5.

Accordingly, the fifth planetary gear set PG5 receives torque in parallel by the fifth sun gear S5 and the fifth ring gear R5, and provides the torque to the second shaft SH2 and the output shaft OUT by forming the fourth shifting stage with the fifth planet carrier C5

Shifting to the fifth shifting stage is implemented by causing the third clutch CL3 to be released and the first clutch CL1 to be engaged.

When the fourth ring gear R4 fixed by the third brake B3 provides a reactive force, since the second clutch CL2 is engaged, the power transmitted to the first shaft SH1 is transmitted to the fifth shaft SH5 through the second ring gear R2 and the second planet carrier C2 to arrive at the fifth sun gear S5. The power transmitted to the fifth planet carrier C5 through the clutch CL1 through the first ring gear R1, the third shaft SH3, and the first clutch CL1 is drawn out through the second shaft SH2 and the output shaft OUT by forming the fifth shifting stage with the power transmitted to the fifth sun gear S5.

Shifting to the sixth shifting stage is implemented by causing the second clutch CL2 to be released and the third clutch CL3 to be engaged.

The power provided to the input shaft IN and the first shaft SH1 is transmitted to the fifth sun gear S5 through the first sun gear S1 of the first planetary gear set PG1, the seventh shaft SH7, the third clutch CL3, and the fifth shaft SH5 and is transmitted to the fifth planet carrier C5 through the first ring gear R1, the third shaft SH3, the first clutch CL1, and the second shaft SH2. The fifth sun gear S5 receives, through the sixth shaft SH6, a reactive force provided from the fourth ring gear R4 fixed by the third brake B3, causing output of the sixth shifting stage to be drawn out through the fifth planet carrier C5 and the second shaft SH2.

Shifting to the seventh shifting stage is implemented by causing the third brake B3 to be released and the second clutch CL2 to be engaged.

All the rotation elements of the first planetary gear set, the second planetary gear set, and the third planetary gear set are integrated and rotated by the engagement of all the first clutch CL1, the second clutch CL2, and the third clutch CL3. Accordingly, the second shaft SH2 connected to the fifth planet carrier C5 and the fifth shaft SH5 connected to the fifth sun gear S5 are also rotated at the same speed. Consequently, all the rotation elements of the fifth planetary gear set PG5 also integrally rotate to be coincide with the speed of the input shaft IN, implementing the seventh stage of 1:1 gear ratio.

Shifting to the eighth shifting stage is implemented by causing the second clutch CL2 to be released and the second brake B2 to be engaged.

The power provided to the input shaft IN and the first shaft SH1 is transmitted to the fifth sun gear S5 through the first sun gear S1 of the first planetary gear set PG1, the seventh shaft SH7, the third clutch CL3, and the fifth shaft SH5 and is transmitted to the fifth planet carrier C5 through the first ring gear R1, the third shaft SH3, the first clutch CL1, and the second shaft SH2. The fourth sun gear S4 is fixed by the second brake B2 and provides a reactive force to the fifth sun gear S5 through the sixth shaft SH6, causing the power of the eighth shifting stage to be drawn out through the fifth planet carrier C5 and the second shaft SH2.

Shifting to the ninth shifting stage is implemented by causing the third clutch CL3 to be released and the first brake B1 to be engaged.

Since the first sun gear S1 is fixed by the first brake B1, the power transmitted to the first shaft SH1 and the first planet carrier C1 is accelerated by the first ring gear R1 and is transmitted to the fifth planet carrier C5 through the shaft SH3 and the first clutch CL1, allowing the output of the ninth shifting stage to be formed with the output shaft OUT.

Shifting to the tenth shifting stage is implemented by causing the first brake B1 to be released and the second clutch CL2 to be engaged.

The power of the first shaft SH1 is provided to the fifth sun gear S5 through the second clutch CL2 and the fifth shaft SH5 and is transmitted to the fifth planet carrier C5 through the first ring gear R1, the third shaft SH3, and the first clutch CL1, being accelerated compared to the power transmitted to the fifth sun gear S5 and drawn out to the output shaft OUT while forming the tenth shifting stage.

The R-stage, which is the reverse stage, is implemented by causing the third clutch CL3, the first brake B1, and the third brake B3 to be engaged with each other.

Since the second planet carrier C2 is fixed by the first brake B1, the power transmitted to the second ring gear R2 through the first shaft SH1 is reversed by the second sun gear S2 and is transmitted to the third sun gear S3 through the fourth shaft SH4. Since the third ring gear R3 is fixed by the first brake B1, the power transmitted to the third sun gear S3 is decelerated by the third planet carrier C3 and is transmitted to the fourth sun gear S4 through the eighth shaft SH8. Since the fourth ring gear R4 is fixed by the third brake B3, the power of the fourth sun gear S4 is provided to the fifth ring gear R5 through the sixth shaft SH6. Since the fifth sun gear S5 is fixed by the first brake B1 and the third clutch CL3, the power of the fifth ring gear R5 is decelerated again and is drawn out to the output shaft OUT while forming the reverse state with the fifth planet carrier C5.

Meanwhile, the present referred to as described above may be expressed as follows.

That is, the present invention includes a first planetary gear set PG1, a second planetary gear set PG2, a third planetary gear set PG3, a fourth planetary gear set PG4, and a fifth planetary gear set PG5, each of which includes three rotation elements; six coupling elements configured to provide a frictional force variably; and nine shafts connected to the rotation elements of the planetary gear sets.

Here, the first shaft SH1 is directly connected to the second rotation element of the first planetary gear set PG1, the third rotation element of the second planetary gear set PG2, and the input shaft IN, the second shaft SH2 is directly connected to the second rotation element of the fifth planetary gear set PG5 and the output shaft OUT, the third shaft SH3 is directly connected to the third rotation element of the first planetary gear set PG1, the fourth shaft SH4 is directly connected to the first rotation element of the second planetary gear set PG2 and the first rotation element of the third planetary gear set PG3, the fifth shaft SH5 is directly connected to the second rotation element of the second planetary gear set PG2 and the first rotation element of the fifth planetary gear set PG5, the sixth shaft SH6 is directly connected to the second rotation element of the fourth planetary gear set PG4 and the third rotation element of the fifth planetary gear set PG5, and the remaining three shafts are fixedly secured to the transmission housing.

The three shafts, which are configured for being fixed to the transmission housing, include the seventh shaft SH7, the eighth shaft SH8, and the ninth shaft SH9. The seventh shaft SH7 is directly connected to the first rotation element of the first planetary gear set PG1 and the third rotation element of the third planetary gear set PG3, the eighth shaft SH8 is directly connected to the second rotation element of the third planetary gear set PG3 and the first rotation element of the fourth planetary gear set PG4, and the ninth shaft SH9 is directly connected to the third rotation element of the fourth planetary gear set PG4.

In the case of the exemplary embodiment of FIG. 1, among the six coupling elements, the first clutch CL1 is disposed between the second shaft SH2 and the third shaft SH3, the second clutch CL2 is disposed between the first shaft SH1 and the fifth shaft SH5, the third clutch CL3 is disposed between the fifth shaft SH5 and the seventh shaft SH7, the first brake B1 is disposed between the seventh shaft SH7 and the transmission housing HS, the second brake B2 is disposed between the eighth shaft SH8 and the transmission housing HS, and the third brake B3 is disposed between the ninth shaft SH9 and the transmission housing HS.

In the case of the exemplary embodiment of FIG. 3, among the six coupling elements, the first clutch CL1 is disposed between the second shaft SH2 and the third shaft SH3, the second clutch CL2 is disposed between the fourth shaft SH4 and the fifth shaft SH5, the third clutch CL3 is disposed between the fifth shaft SH5 and the seventh shaft SH7, the first brake B1 is disposed between the seventh shaft SH7 and the transmission housing HS, the second brake B2 is disposed between the eighth shaft SH8 and the transmission housing HS, and the third brake B3 is disposed between the ninth shaft SH9 and the transmission housing HS.

The first to fifth planetary gear sets PG1 to PG5 are disposed in the axial direction of the input shaft IN and the output shaft OUT in the order of the first planetary gear set PG1, the second planetary gear set PG2, the third planetary gear set PG3, the fourth planetary gear set PG4, and the fifth planetary gear set PG5.

The rotation elements of each of the first to fifth planetary gear sets PG1 to PG5 are disposed in the order the first rotation element, the second rotation element, and the third rotation element from the rotation center toward the outside in the radial direction, in which the first rotation element is a sun gear of each planetary gear set, the second rotation element is a carrier, and the third rotation element is a ring gear.

As described above, with the configuration described above, the planetary gear train of an automatic transmission for a vehicle according to an exemplary embodiment of the present invention forms shifting stages of forward 10 speeds and 1 reverse speed and has a gear ratio span of 9.6. Thus, the fuel efficiency may be improved by making it possible to drive the engine mainly in a more efficient region.

In an exemplary embodiment of the present invention, the minimum inter-stage ratio is 1.137 or more, and the linearity of the inter-stage ratio changes with the shifting stage change is ensured to be similar to the ideal tendency of change of the inter-stage ratio, so that vehicle acceleration and rhythm of the engine speed before and after shifting may be improved, maximizing the driving performance of the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the planetary gear train apparatus comprising:
    an input shaft configured to receive power;
    an output shaft configured to output power;
    a first planetary gear set having a first rotation element, a second rotation element, and a third rotation element;
    a second planetary gear set having a fourth rotation element, a fifth rotation element, and a sixth rotation element;
    a third planetary gear set having a seventh rotation element, an eighth rotation element, and a ninth rotation element;
    a fourth planetary gear set having a tenth rotation element, an eleventh rotation element, and a twelfth rotation element;
    a fifth planetary gear set having a thirteenth rotation element, a fourteenth rotation element, and a fifteenth rotation element;
    a first shaft fixedly connected to the second rotation element, the sixth rotation element, and the input shaft;
    a second shaft fixedly connected to the fourteenth rotation element and the output shaft;
    a third shaft fixedly connected to the third rotation element;
    a fourth shaft fixedly connected to the fourth rotation element and the seventh rotation element;
    a fifth shaft fixedly connected to the fifth rotation element and the thirteenth rotation element;
    a sixth shaft fixedly connected to the eleventh rotation element and the fifteenth rotation element;
    a seventh shaft fixedly connected to the first rotation element and the ninth rotation element;
    an eighth shaft fixedly connected to the eighth rotation element and the tenth rotation element; and
    a ninth shaft fixedly connected to the twelfth rotation element.

2. The planetary gear train apparatus of claim 1, further including:
    six coupling elements for selectively connecting two shafts among the first to ninth shafts, or a transmission housing and a shaft among the first to ninth shafts,
    wherein, among the six coupling elements, three coupling elements are operatively controlled to be coupled such that a predetermined one of forward or reverse shifting stages is implemented.

3. The planetary gear train apparatus of claim 2, wherein the six coupling elements includes:
    three clutches configured to interconnect two shafts among the first to ninth shafts; and
    three brakes configured to selectively connect a shaft, which is not connected to the input shaft or the output shaft among the first to ninth shafts, to the transmission housing.

4. The planetary gear train apparatus of claim 2, wherein the six coupling elements includes:
    a first clutch mounted between the second shaft and the third shaft;
    a second clutch mounted between the first shaft and the fifth shaft;
    a third clutch mounted between the fifth shaft and the seventh shaft;
    a first brake mounted between the seventh shaft and the transmission housing;
    a second brake mounted between the eighth shaft and the transmission housing; and
    a third brake mounted between the ninth shaft and the transmission housing.

5. The planetary gear train apparatus of claim 4, wherein the second planetary gear set is configured such that two of the first, fourth, and fifth shafts are selectively connectable to rotate integrally.

6. The planetary gear train apparatus of claim 2, wherein the six coupling elements includes:
    a first clutch mounted between the second shaft and the third shaft;
    a second clutch mounted between the fourth shaft and the fifth shaft;
    a third clutch mounted between the fifth shaft and the seventh shaft;
    a first brake mounted between the seventh shaft and the transmission housing;
    a second brake mounted between the eighth shaft and the transmission housing; and
    a third brake mounted between the ninth shaft and the transmission housing.

7. The planetary gear train apparatus of claim 1,
    wherein the first rotation element, the second rotation element, and the third rotation element include a first sun gear, a first planet carrier, and a first ring gear, respectively,
    wherein the fourth rotation element, the fifth rotation element, and the sixth rotation element include a second sun gear, a second planet carrier, and a second ring gear, respectively,
    wherein the seventh rotation element, the eighth rotation element, and the ninth rotation element include a third sun gear, a third planet carrier, and a third ring gear, respectively,
    wherein the tenth rotation element, the eleventh rotation element, and the twelfth rotation element include a fourth sun gear, a fourth planet carrier, and a fourth ring gear, respectively, and
    wherein the thirteenth rotation element, the fourteenth rotation element, and the fifteenth rotation element include a fifth sun gear, a fifth planet carrier, and a fifth ring gear, respectively.

8. The planetary gear train apparatus of claim 1, wherein the first, second, third, fourth, and fifth planetary gear sets are disposed in an order of the first, second, third, fourth, and fifth planetary gear sets from a first side to a second side thereof with respect to an engine side.

9. A planetary gear train apparatus of an automatic transmission for a vehicle, the planetary gear train apparatus comprising:

a first planetary gear set, a second planetary gear set, a third planetary gear set, a fourth planetary gear set, and a fifth planetary gear set, each of which includes three rotation elements having first, second, and third rotation elements;

six coupling elements configured to provide a frictional force variably; and a first shaft fixedly connected to the second rotation element of the first planetary gear set, the third rotation element of the second planetary gear set, and the input shaft, a second shaft fixedly connected to the second rotation element of the fifth planetary gear set and the output shaft, a third shaft fixedly connected to the third rotation element of the first planetary gear set, a fourth shaft fixedly connected to the first rotation element of the second planetary gear set and the first rotation element of the third planetary gear set, a fifth shaft fixedly connected to the second rotation element of the second planetary gear set and the first rotation element of the fifth planetary gear set, a sixth shaft fixedly connected to the second rotation element of the fourth planetary gear set and the third rotation element of the fifth planetary gear set, and seventh to ninth shafts disposed in a transmission housing to be configured for being fixed to the transmission housing.

10. The planetary gear train apparatus of claim 9, wherein the seventh shaft is fixedly connected to the first rotation element of the first planetary gear set and the third rotation element of the third planetary gear set, wherein the eighth shaft is fixedly connected to the second rotation element of the third planetary gear set and the first rotation element of the fourth planetary gear set, and wherein the ninth shaft is fixedly connected to the third rotation element of the fourth planetary gear set.

11. The planetary gear train apparatus of claim 10, wherein the first clutch is disposed between the second shaft and the third shaft, wherein the second clutch is disposed between the first shaft and the fifth shaft, wherein the third clutch is disposed between the fifth shaft and the seventh shaft, wherein the first brake is disposed between the seventh shaft and the transmission housing, wherein the second brake is disposed between the eighth shaft and the transmission housing, and wherein the third brake is disposed between the ninth shaft and the transmission housing.

12. The planetary gear train apparatus of claim 10, wherein the first clutch is disposed between the second shaft and the third shaft, wherein the second clutch is disposed between the fourth shaft and the fifth shaft, wherein the third clutch is disposed between the fifth shaft and the seventh shaft, wherein the first brake is disposed between the seventh shaft and the transmission housing, wherein the second brake is disposed between the eighth shaft and the transmission housing, and wherein the third brake is disposed between the ninth shaft and the transmission housing.

13. The planetary gear train apparatus of claim 9, wherein the first to fifth planetary gear sets are disposed in an order of the first planetary gear set, the second planetary gear set, the third planetary gear set, the fourth planetary gear set, and the fifth planetary gear set in an axial direction of the input shaft and the output shaft with respect to an engine side.

14. The planetary gear train apparatus of claim 9, wherein the first, second, and third rotation elements of each of the first to fifth planetary gear sets are disposed in an order of the first rotation element, the second rotation element, and the third rotation element toward a radially external side from a rotation center.

* * * * *